United States Patent [19]

Thomas, III et al.

[11] 4,097,296
[45] Jun. 27, 1978

[54] LOW-TEMPERATURE DEVITRIFIABLE SEALING COMPOSITION

[75] Inventors: Walter B. Thomas, III, Horseheads; Christopher H. Welker, Corning, both of N.Y.

[73] Assignee: Corning Glass Works, Corning, N.Y.

[21] Appl. No.: 781,845

[22] Filed: Mar. 28, 1977

[51] Int. Cl.² ........................... C03C 3/22; C03C 3/12; C03C 3/10
[52] U.S. Cl. ..................................... 106/53; 106/39.6; 106/47 R
[58] Field of Search ....................... 106/39.6, 47 R, 53

[56] References Cited

U.S. PATENT DOCUMENTS

| 3,258,350 | 6/1966 | Martin et al. | 106/47 R |
| 3,951,669 | 4/1976 | Malmendier | 106/39.6 |

Primary Examiner—Winston A. Douglas
Assistant Examiner—Mark Bell
Attorney, Agent, or Firm—Kees van der Sterre; Clinton S. Janes, Jr.; Clarence R. Patty, Jr.

[57] ABSTRACT

A devitrifiable sealing composition which provides a strong devitrified seal with color television picture tube glass at reduced sealing temperatures, and which is thermally compatible with such glass during sealing and subsequent tube processing, is described.

2 Claims, 2 Drawing Figures

LOW-TEMPERATURE DEVITRIFIABLE SEALING COMPOSITION

BACKGROUND OF THE INVENTION

The present invention is in the field of sealing compositions and relates particularly to devitrifiable sealing compositions useful for sealing television picture tube components.

Devitrified glass seals in which a fused sealing glass is at least partly crystallized by devitrification, and lead-zinc borate glasses adapted to such devitrified glass seal production, are described in U.S. Pat. No. 2,889,952 to Claypoole. Such sealing glasses are particularly useful in the production of evacuated electron tubes and the like, because they form a seal at low temperatures, but are converted during sealing to a crystalline material which resists deformation to temperatures well in excess of the temperature at which sealing is accomplished.

British Pat. No. 836,500 discloses devitrifiable sealing glasses containing PbO, $B_2O_3$, ZnO and $SiO_2$ which have softening points not exceeding 385° C. and devitrify at a rate useful for providing a good seal. These glasses have an average linear coefficient of thermal expansion in devitrified form of about 80–105 × $10^{-7}$/° C. in the 0°–300° C. temperature range, and are particularly useful for sealing the panel and funnel members of color television picture tubes at temperatures of 450° C. or below.

U.S. Pat. No. 3,258,350 to Martin et al. describes a sealing composition consisting of a lead borosilicate or lead-zinc borate glass component and a refractory filler component. The refractory filler, which consists of zircon, functions to reduce the thermal expansion coefficient of the seal, so that the sealing of lower expansion glasses may be accomplished without excessive expansion mismatch between the seal and the glass.

U.S. Pat. No. 3,951,669 to Malmendier et al. discloses the use of zinc beta-quartz refractory fillers to modify the thermal expansion behavior of lead borate and lead borosilicate sealing glasses. These additives reduce seal thermal expansion without inhibiting glass flow at sealing temperatures. Such fillers are particularly useful in combination with soft sealing glass compositions, e.g., compositions containing 1% or more of a halogen such as fluorine, which exhibit good flow at comparatively low sealing temperatures.

Notwithstanding the relatively advanced state of the sealing art, as evidenced by the above patents, devitrifiable sealing compositions which perform satisfactorily at sealing temperatures below the 440°–450° C. lehr temperatures currently employed for sealing panel and funnel television picture tube components have not been introduced. Our own experimental evidence indicates that this may be attributable to a seal compatibility problem exhibited by certain soft devitrifiable sealing compositions comprising refractory fillers, which problem is manifested by thermal failure of the seal as the sealed panel-funnel assembly is reheated during subsequent steps of the tube assembly process.

It is the principal object of the present invention to provided a thermally devitrifiable sealing composition which permits sealing at reduced temperatures, yet is fully compatible with present television picture tube components, as evidenced by a low seal failure rate during subsequent tube processing.

Other objects and advantages of the invention will become apparent from the following description thereof.

SUMMARY OF THE INVENTION

In accordance with the present invention we have discovered an area of devitrifiable sealing composition wherein low softening points, good flow characteristics, and reduced sealing temperatures in combination with good strength and excellent thermal expansion compatibility with available color television panel and funnel glasses are provided. These sealing compositions exhibit thermal expansion compatibility equivalent to that demonstrated by present highertemperature thermally devitrifiable sealing compositions.

The devitrifiable sealing compositions of the invention are mixtures consisting of a zircon component and devitrifiable glass component, including 2–6 parts by weight of zircon for each 100 parts by weight of devitrifiable glass, wherein the devitrifiable glass has a composition consisting essentially, in parts by weight, of about:

77.4 ± 2.0 parts PbO
10.2 ± 1.0 parts ZnO
8.9 ± 1.0 parts $B_2O_3$
2.6 ± 0.25 parts $SiO_2$
0.17 ± 0.10 parts MgO
0.22 ± 0.10 parts BaO, and
0.35 ± 0.10 parts F A composition within this range typically provides a strong, hermetic seal when cycled to a peak sealing temperature in the 410°–425° C. range. Also, the thermal expansion characteristics of the fired composition are such that a room temperature thermal expansion mismatch against present commercial color television panel and funnel glasses of about −125 to 0 parts per million is provided after processing at normal sealing temperatures.

Most importantly, the in-process or so-called dynamic expansion characteristics of the composition are such that large changes in thermal expansion mismatch during cooling or subsequent reheating of the sealed product are avoided. This characteristic provides a sealed product exhibiting acceptable thermal performance during subsequent processing, but which can be manufactured utilizing a significantly reduced sealing temperature.

DESCRIPTION OF THE DRAWING

The invention may be further understood by reference to the drawing, wherein.

DETAILED DESCRIPTION

Figure 1:
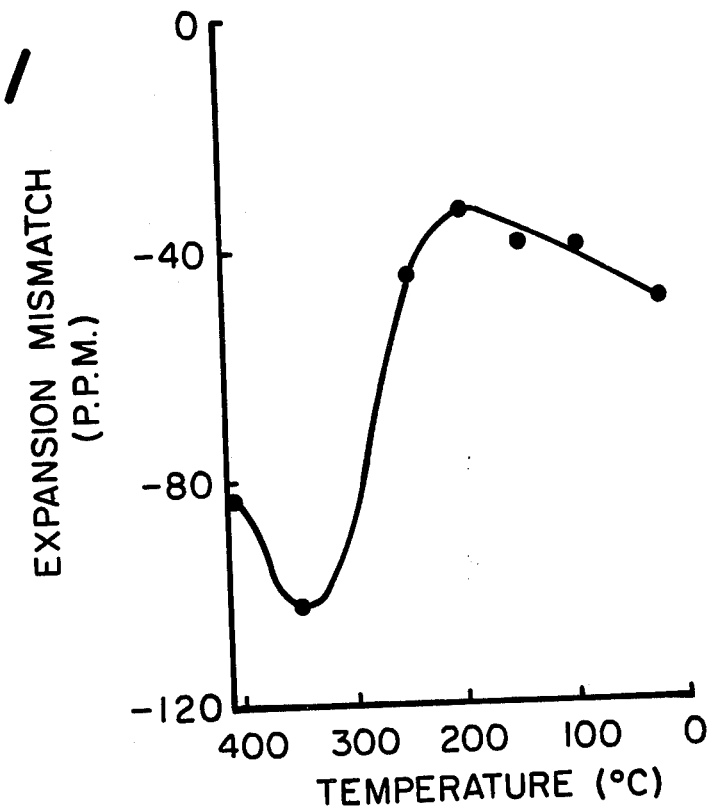
FIG. 1 is a graph consisting of a plot of thermal expansion mismatch versus temperature as measured between a commercially available color television glass and a lowtemperature refractory-filled devitrified glass seal having a composition outside the scope of the present invention. The expansion mismatch measurements cover a temperature interval during which the glass and devitrified seal are cooled to room temperature after sealing. A large change in the expansion mismatch value during cooling through the 350°–200° C. temperature range is evident.

Present commercially available panel and funnel glasses for color television picture tubes are alkali silicate glasses having average linear coefficients of thermal expansion (0°–300°C.) of about $98.5 \times 10^{-7}/°$ C. These glasses are hereinafter referred to simply as 98 expansion color television glasses. It is well known that a devitrifiable sealing composition intended for use in the fabrication of tubes from such glasses must form a seal having a thermal expansion coefficient closely approximating this value in order to avoid thermal expansion mismatch resulting in high seal stresses and consequent tube failure.

A sensitive test for thermal expansion mismatch is the well known seal test wherein a seal is formed between a sealing composition and a glass, and the thermal expansion mismatch between the glass and seal is then calculated from stress measurements using conventional stress analysis equipment. Thermal expansion mismatch is typically reported in parts per million of length, referring to the apparent difference in thermal contraction between the seal and the glass occuring when both are cooled to room temperature following sealing. A negative thermal expansion mismatch value conventionally implies lower thermal contraction in the seal than in the substrate glass.

Means are known for adjusting the thermal expansion of a devitrified sealing glass so that a specified thermal expansion mismatch at room temperature is obtained. Thus prior art sealing compositions can provide a room temperature expansion mismatch in the range of $-125$ to 0 p.p.m. against 98 expansion color television bulb glass after sealing at 440° C.

The use of lower sealing temperatures would be attractive from an energy conservation standpoint. A sealing composition exhibiting lower softening and reduced sealing temperatures could be provided, for example, by adding fluorine to a conventional sealing glass composition. However, such additions cause an increase in the thermal expansion of the devitrified seal, making it incompatible with the glass to be sealed.

The addition of a refractory low-expansion filler such as zircon, beta-quartz or the like to a fluorine-softened sealing composition such as above described can reduce the thermal expansion of the devitrified seal. In this way, compatibility between the seal and the glass to be joined might be restored.

The expedient of balancing low-expansion filler additions against fluoride additions may result in a low-temperature seal providing an acceptably low expansion mismatch against 98 expansion color television glass at room temperature. However, such a seal would not necessarily have actual utility in the fabrication of a color television picture tube bulb.

Bulbs for color television picture tubes are routinely subjected to reheating, after the funnel and panel elements have been sealed, for the purpose of cathode activation and tube evacuation. We have found that seals having a satisfactory room temperature expansion mismatch against color television glass may nevertheless exhibit unacceptable failure levels on reheating during such subsequent tube processing, behavior which we have now correlated with the dynamic expansion behavior of the seal.

FIG. 1 of the drawing illustrates the dynamic expansion behavior of a devitrified seal as it is cooled to room temperature at the end of a sealing cycle. The cooling characteristics of the seal are shown in terms of the thermal expansion mismatch which is observed between the devitrified seal and a 98 expansion color television glass. The television glass is Corning Code 0138 color television funnel glass, a lead alkali silicate glass having an average linear coefficient of thermal expansion (0°–300° C.) of about $98.5 \times 10^{-7}/°$ C., commercially available from Corning Glass Works, Corning, N.Y. The sealing composition employed in making the seal was a low-temperature sealing composition (410° C. sealing temperature), which consisted of 3.5 parts refractory filler and 100 parts devitrifiable glass by weight. The devitrifiable glass had a composition, in parts by weight, of about 77.0 parts PbO, 10.7 parts ZnO, 8.9 parts $B_2O_3$, 2.7 parts $SiO_2$, 0.2 parts MgO, and 0.7 parts F. The sealing cycle comprised an exposure of 45 minutes duration to a peak sealing temperature of 410° C.

A significant feature of the cooling curve of FIG. 1 is a very rapid increase in the thermal expansion mismatch value over the 350°–200° C. cooling range. Although the endpoint (room temperature) expansion mismatch is $-50$ p.p.m., an acceptable value, the change in expansion mismatch in the 350°–200° C. range exceeds 60 p.p.m.

Television picture tube bulbs sealed with this composition exhibit significant seal failure rates when reheated after sealing. For example, when reheated at a rate of 12° C. per minute, a rate which might be encountered in tube fabrication, frequent seal breakage occurs in the temperature range of about 170°–250° C. The exact mechanism of seal failure is not fully understood, but appears to be related to the large apparent difference in thermal expansion coefficient between the bulb glass and the seal which is encountered in the 350°–200° C. temperature range.

Figure 2:
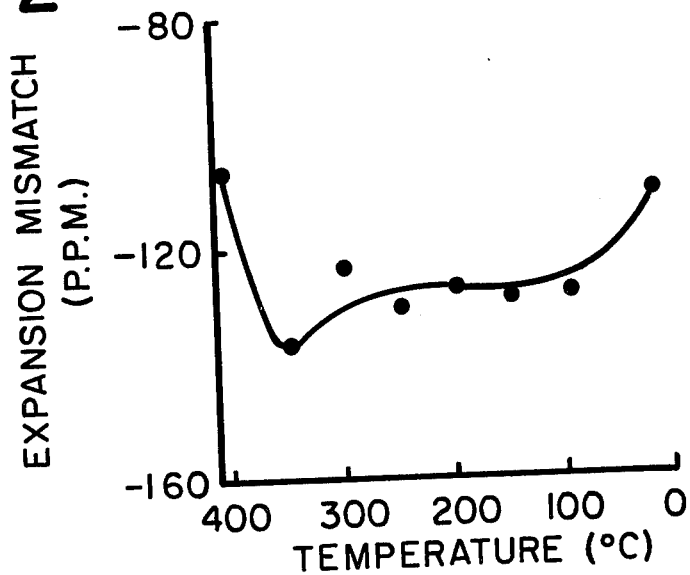
FIG. 2 is a graph similar in form to FIG. 1, plotting thermal expansion mismatch versus cooling temperature as measured between a commercially available color television glass and a low-temperature seal provided in accordance with the invention. No large change in the thermal expansion mismatch value over the 350°–200° C. cooling range is observed.

In contrast to the cooling behavior illustrated in FIG. 1 of the drawing, FIG. 2 illustrates the dynamic expansion behavior of a devitrified seal provided in accordance with the invention as it is cooled to room temperature at the end of a sealing cycle. Again, the cooling characteristics of the seal are shown in terms of the thermal expansion mismatch against Corning Code 0138 color television funnel glass. The sealing composition employed in making the seal consisted of 4 parts zircon and 100 parts devitrifiable glass by weight, the devitrifiable glass consisting, in parts by weight, of about 77.35 parts PbO, 10.33 parts ZnO, 9.0 parts $B_2O_3$, 2.7 parts $SiO_2$, 0.18 parts MgO, 0.22 parts BaO, and 0.37 parts F. This sealing composition had a softening point of about 360° C., a sealing temperature of about 415° C., and the sealing cycle comprised a hold of 45 minutes at 415° C.

The end-point (room temperature) thermal expansion mismatch between the devitrified seal and the glass is about $-110$ p.p.m., an acceptable value. The cooling curve does not evidence a rapidly changing thermal expansion mismatch value between the glass and seal over the 350°–200° C. cooling range, the observed change being less than about 20 p.p.m.

The reheating of color television picture tube bulbs having seals with the mismatch characteristics shown in FIG. 2 does not result in unacceptable levels of seal failure. Hence, no seal failures were observed upon reheating sealed bulbs at a 12° C. per minute rate through the 170°–250° C. temperature range. Further tests indicate that the seal failure characteristics of these bulbs are essentially equivalent to those of bulbs sealed at 440° C. using prior art high-temperature sealing compositions.

Based on data such as above described, we have determined that acceptable seal failure characteristics may be preserved if the thermal expansion mismatch value between the seal and 98 expansion color television glass does not change more than about 40 p.p.m. over the 350°–200° C. temperature range during cooling after sealing or upon subsequent reheating. Sealing compositions provided in accordance with the invention readily meet this requirement.

No special formulating or processing steps are required to prepare a devitrifiable sealing composition having the characteristics hereinabove described. The devitrifiable glass component may be provided by compounding a batch for the glass utilizing known glass batching ingredients and procedures. Batch melting may be carried out in a conventional melting unit, such as a platinum-lined tank, at melting temperatures of approximately 1200° C. The glass may be formed into a frit by quenching to cullet and milling to −100 mesh (U.S. Standard Sieve) particle size.

The zircon component of the sealing composition may be added to the fritted glass component by dry blending. Best results are obtained if a relatively coarse zircon, such as G-milled zirconium silicate, commercially available from NL Industries, Inc. Tam Division, Niagara Falls, N.Y., is used.

Composition is critical in providing a sealing composition exhibiting the strength, thermal expansion compatibility, and sealing characteristics hereinabove described. Fluorine is required to obtain the required softness and flow characteristics, but amounts in excess of those specified not only affect dynamic thermal expansion behavior, but also accelerate crystallization and hazard excessive residual seal stress. MgO is essential to retard crystallization and decrease thermal expansion mismatch, but the effects of MgO are highly dependent upon the fluorine level in the glass, and a balance between fluorine and MgO levels must be maintained.

BaO improves seal strength and is also needed to provide the required thermal expansion behavior. Within the specified limits, BaO does not unduly affect glass flow characteristics. However, excessive amounts produce a higher softening point glass.

Finally, zircon has a major effect, not only on the room temperature expansion mismatch between the seal and color television glass, but also upon the dynamic or inprocess characteristics of the sealing composition. Maintaining the prescribed balance between the zircon component and the MgO, BaO and fluorine constituents of the devitrifiable glass component of the composition is critical if a sealing composition exhibiting a reasonably flat dynamic expansion mismatch curve against presently available color television picture tube glass is to be provided.

Although compositions within the broader range hereinabove set forth offer satisfactory performance for sealing applications, optimum properties are provided by a preferred composition wherein the zircon component constitutes 2–5 parts by weight of the composition for each 100 parts of devitrifiable glass, and wherein the devitrifiable glass has a composition consisting essentially, in parts by weight, of about:

77.4 ± 0.2 parts PbO
10.2 ± 0.2 parts ZnO
8.9 ± 0.2 parts $B_2O_3$
2.6 ± 0.1 parts $SiO_2$
0.17 ± 0.03 parts MgO
0.22 ± 0.05 parts BaO, and
0.35 ± 0.05 parts F This composition exhibits a sealing temperature of about 415° and provides a devitrified seal having a modulus of rupture strength of 6500 ± 500 psi as well as a thermal expansion mismatch value against 98 expansion color television glass which is within the range of about 0 to −125 ppm at room temperature and does not change more than about 40 ppm over the 350°–200° C. temperature range.

We claim:
1. A low-temperature devitrifiable sealing composition compatible with color television picture tube glass, said composition consisting of a zircon component and a devitrifiable glass component and including 2–6 parts zircon by weight for each 100 parts of devitrifiable glass by weight, wherein the devitrifiable glass component has a composition consisting essentially, in parts by weight, of about:

77.4 ± 2.0 parts PbO
10.2 ± 1.0 parts ZnO
8.9 ± 1.0 parts $B_2O_3$
2.6 ± 0.25 parts $SiO_2$
0.17 ± 0.10 parts MgO
0.22 ± 0.10 parts BaO, and
0.35 ± 0.10 parts F said sealing composition exhibiting a sealing temperature of about 410°–425° C. and providing a devitrified seal having a thermal expansion mismatch value against 98 expansion color television glass which is within the range of −125 to 0 ppm at room temperature and does not change more than about 40 p.p.m. over the 350°–200° C. temperature range.

2. A low-temperature devitrifiable sealing composition in accordance with claim 1 wherein the zircon component is within the range of 2–5 parts by weight for each 100 parts of devitrifiable glass, and wherein the devitrifiable glass component has a composition consisting essentially, in parts by weight, of about:

77.4 ± 0.2 parts PbO
10.2 ± 0.2 parts ZnO
8.9 ± 0.2 parts $B_2O_3$
2.6 ± 0.1 parts $SiO_2$
0.17 ± 0.03 parts MgO
0.22 ± 0.05 parts BaO, and
0.35 ± 0.05 parts F said composition exhibiting a sealing temperature of about 415° C. and providing a devitrified seal having a modulus of rupture strength of about 6500 ± 500 psi.

* * * * *

UNITED STATES PATENT AND TRADEMARK OFFICE
CERTIFICATE OF CORRECTION

PATENT NO. : 4,097,296

DATED : June 27, 1978

INVENTOR(S) : Walter B. Thomas, III and Christopher H. Welker

It is certified that error appears in the above-identified patent and that said Letters Patent are hereby corrected as shown below:

Column 1, line 64, "provided" should be -- provide --.

Column 2, line 14, "highertemperature" should be -- higher-temperature --.

Column 2, line 55, "lowtemperature" should be -- low-temperature --.

Column 5, line 51, "inprocess" should be -- in-process --.

Signed and Sealed this

Twenty-seventh Day of March 1979

[SEAL]

Attest:

RUTH C. MASON
*Attesting Officer*

DONALD W. BANNER
*Commissioner of Patents and Trademarks*